:[](#)

United States Patent
Kim et al.

(10) Patent No.: US 10,186,071 B2
(45) Date of Patent: Jan. 22, 2019

(54) RENDERING SYSTEM AND METHOD FOR GENERATING RAY

(71) Applicant: SAMSUNG ELECTRONICS CO., LTD., Suwon-si (KR)

(72) Inventors: Kyung-su Kim, Seoul (KR); Jae-woong Lee, Seongnam-si (KR); In-sang Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 289 days.

(21) Appl. No.: 14/702,168

(22) Filed: May 1, 2015

(65) Prior Publication Data
US 2015/0317819 A1 Nov. 5, 2015

(30) Foreign Application Priority Data

May 2, 2014 (KR) .................. 10-2014-0053472
Aug. 20, 2014 (KR) .................. 10-2014-0108366

(51) Int. Cl.
*G06T 15/06* (2011.01)
*G06T 15/60* (2006.01)
*G06T 1/60* (2006.01)

(52) U.S. Cl.
CPC .............. *G06T 15/06* (2013.01); *G06T 1/60* (2013.01); *G06T 15/60* (2013.01)

(58) Field of Classification Search
CPC ..................................................... G06T 15/06
See application file for complete search history.

(56) References Cited

U.S. PATENT DOCUMENTS

| 8,237,711 B2 | 8/2012 | McCombe et al. |
| 8,248,402 B2 | 8/2012 | Brown et al. |
| 8,619,079 B2 | 12/2013 | Peterson et al. |
| 8,692,834 B2 | 4/2014 | Peterson et al. |
| 8,836,702 B2 | 9/2014 | Yoon et al. |
| 2009/0115784 A1* | 5/2009 | Tomite .................... G06T 15/06 345/426 |
| 2010/0141652 A1* | 6/2010 | Nutter ..................... G06T 15/06 345/426 |

(Continued)

FOREIGN PATENT DOCUMENTS

EP 2 437 217 A2 4/2012
KR 19970071368 A 11/1997

(Continued)

OTHER PUBLICATIONS

Communication dated Jul. 30, 2015, issued by the International Searching Authority in counterpart International Application No. PCT/KR2015/003942 (PCT/ISA/210 and PCT/ISA/237).

*Primary Examiner* — Mark K Zimmerman
*Assistant Examiner* — Jonathan M Cofino
(74) *Attorney, Agent, or Firm* — Sughrue Mion, PLLC (57) ABSTRACT

A method for performing a rendering process of a rendering system includes generating a primary ray to render an image, determining whether the primary ray is capable of generating at least one secondary ray, storing information on the primary ray in a reference memory in response to determining that the primary ray is capable of generating the at least one secondary ray; and generating the at least one secondary ray based on the stored information on the primary ray.

20 Claims, 9 Drawing Sheets

(56) References Cited

U.S. PATENT DOCUMENTS

| | | | |
|---|---|---|---|
| 2010/0164948 A1* | 7/2010 | Kho | G06T 15/06 345/419 |
| 2010/0328310 A1 | 12/2010 | Peterson et al. | |
| 2011/0234583 A1* | 9/2011 | Bakalash | G06T 15/06 345/419 |
| 2011/0285710 A1* | 11/2011 | Mejdrich | G06T 15/06 345/426 |
| 2012/0069023 A1* | 3/2012 | Hur | G06T 15/06 345/426 |
| 2012/0081368 A1* | 4/2012 | Park | G06T 15/005 345/426 |
| 2013/0314420 A1 | 11/2013 | Yoon et al. | |
| 2014/0176550 A1* | 6/2014 | Park | G06T 15/04 345/426 |

FOREIGN PATENT DOCUMENTS

| | | |
|---|---|---|
| KR | 10-2010-0094532 A | 8/2010 |
| KR | 10-2012-033585 A | 4/2012 |
| WO | 2008037599 A1 | 4/2008 |
| WO | 2010137822 A2 | 12/2010 |
| WO | 2012111864 A1 | 8/2012 |

\* cited by examiner

FIG. 9

RENDERING SYSTEM AND METHOD FOR GENERATING RAY

CROSS-REFERENCE TO RELATED APPLICATIONS

This application claims priority from Korean Patent Application No. 10-2014-0053472, filed on May 2, 2014, and Korean Patent Application No. 10-2014-0108366, filed on Aug. 20, 2014, in the Korean Intellectual Property Office, the disclosures of which are incorporated herein by reference in their entireties.

BACKGROUND

1. Field

Apparatuses and methods consistent with exemplary embodiments relate to generating and rendering a ray, and more particularly, managing a memory for generating and rendering a ray.

2. Description of the Related Art

A ray tracing method refers to a method of reverse-tracing a route of light along a ray to each pixel in a virtual screen and generating an image in a point of view of a camera.

The ray tracing method generally includes operations of ray generation, acceleration structure traversal, intersection test, and shading. A final color of a ray which is generated in a ray generator is determined through the shading operation after obtaining information on an intersection through the acceleration structure traversal operation and the intersection test operation. According to a medium of the intersection, secondary rays, such as reflection, refraction, or a shadow ray, are derived from a primary ray generated from the ray generator. The ray generator stores the secondary rays in order to perform the acceleration structure traversal operation and following operations with respect to the secondary rays.

However, in case of a plurality of light sources and objects, a space for storing rays may be insufficient at times. In this case, performance of a rendering system may be deteriorated due to memory stalls with respect to the entire rendering system.

Accordingly, there is a need for a method of reducing a load of a memory to enhance performance of the rendering system.

SUMMARY

Exemplary embodiments address at least the above problems and/or disadvantages and other disadvantages not described above. Also, the exemplary embodiments are not required to overcome the disadvantages described above, and may not overcome any of the problems described above.

One or more exemplary embodiments provide a rendering system for effectively using a memory by controlling an amount of information on a ray to be stored in the memory and enhancing the performance of the rendering system and a method for generating a ray.

According to an aspect of an exemplary embodiment, there is provided a method for performing a rendering process of a rendering system, the method including: generating a primary ray to render an image; determining whether the primary ray can generate at least one secondary ray; storing information on the primary ray in a memory in response to determining that the primary can generate the at least one secondary ray; and generating the at least one secondary ray based on the information on the primary ray stored in the memory.

The determining may include determining that the primary ray can generate the at least one secondary ray in response to the primary ray intersecting with an object and not being a shadow ray.

The method may further include deleting the information on the primary ray from the memory in response to determining that the primary ray cannot generate the at least one secondary.

The method may further include deleting the information on the primary ray from the memory in response to determining that the at least one secondary ray generates a shadow ray and does not generate a refraction ray or a reflection ray.

The method may further include determining whether the memory includes any information on a ray; and generating a secondary ray, in response to determining that the memory includes a plurality of pieces of information, based on information on a ray which was stored last in the memory from among the plurality of pieces of information.

The method may further include storing a rendering result of the primary ray as a color value in a frame buffer in response to the primary ray being a shadow ray.

The method may further include terminating the rendering process in response to the memory not including any information on a ray.

The information on the primary ray may include information on a direction vector of the primary ray.

According to another aspect of an exemplary embodiment, there is provided a rendering system including: a ray generator configured to generate a primary ray; a renderer configured to render an image based on the generated primary ray; a memory; and a controller configured to determine whether the primary ray can generate at least one secondary ray, store information on the primary ray in the memory in response to determining that the primary ray can generate the at least one secondary ray, and generate the at least one secondary ray based on the stored information on the primary ray stored in the memory.

The controller may be further configured to determine that the primary ray can generate the secondary ray in response to the primary ray interacting with an object and not being a shadow ray.

The controller may be further configured to delete the information on the primary ray from the memory in response to determining that the at least one secondary ray does not generate a secondary ray.

The controller may be further configured to determine whether the memory includes any information on a ray, and in response to determining that the memory includes a plurality of pieces of information, and generate a secondary ray based on information on a ray which was stored last in the memory from among the plurality of pieces of information.

The controller may be further configured to store a rendering result of the primary ray in a frame buffer in response to the primary ray being a shadow ray.

The controller may be further configured to determine whether the memory includes any information on a ray and terminate a rendering process of the rendering system in response to the memory not including any information on a ray.

The information on the primary ray may include information on a direction vector of the primary ray.

According to another aspect of an exemplary embodiment, there is provided a method of performing a rendering process of a rendering system including: generating a primary ray to render an image; storing information on the primary ray in response to the primary ray being capable of generating a derivable secondary ray; and deleting the information on the primary ray in response to the primary ray not being capable of generating an additional derivable secondary ray.

The derivable secondary ray may correspond to a refraction ray or a reflection ray that intersects with an object The derivable secondary ray may be one of a plurality of secondary rays that the primary ray generates, and the storing may include storing the derivable secondary ray in a main stack of a memory; and storing, in a secondary stack of the memory, the plurality of secondary rays other than the derivable secondary ray and a shadow ray.

The derivable secondary ray is a refraction ray or a reflection ray derived from the primary ray, and the storing includes storing information on the refraction ray or information on the reflection ray in a main stack of a memory; storing the information on the refraction ray in a secondary stack of the memory in response to the reflection ray being stored in the main stack; and storing the information on the reflection ray in the secondary stack in response to the refraction ray being stored in the main stack.

The method may further includes loading into the main stack the information on the refraction ray or the information on the reflection ray which is stored in the secondary stack; and determining whether the refraction ray or the reflection ray that corresponds to the loaded information generates a secondary ray.

According to another aspect of an exemplary embodiment, there is provided a non-transitory computer readable storage medium storing a program that is executable by a computer to perform the method of performing the rendering process of the rendering system.

BRIEF DESCRIPTION OF THE DRAWINGS

The above and/or other aspects will be more apparent by describing certain exemplary embodiments, with reference to the accompanying drawings, in which.

DETAILED DESCRIPTION OF EXEMPLARY EMBODIMENTS

Certain exemplary embodiments are described in greater detail below with reference to the accompanying drawings.

In the following description, like drawing reference numerals are used for the like elements, even in different drawings. The matters defined in the description, such as detailed construction and elements, are provided to assist in a comprehensive understanding of exemplary embodiments. However, exemplary embodiments can be practiced without those specifically defined matters. Also, well-known functions or constructions are not described in detail since they would obscure the application with unnecessary detail.

Figure 1:
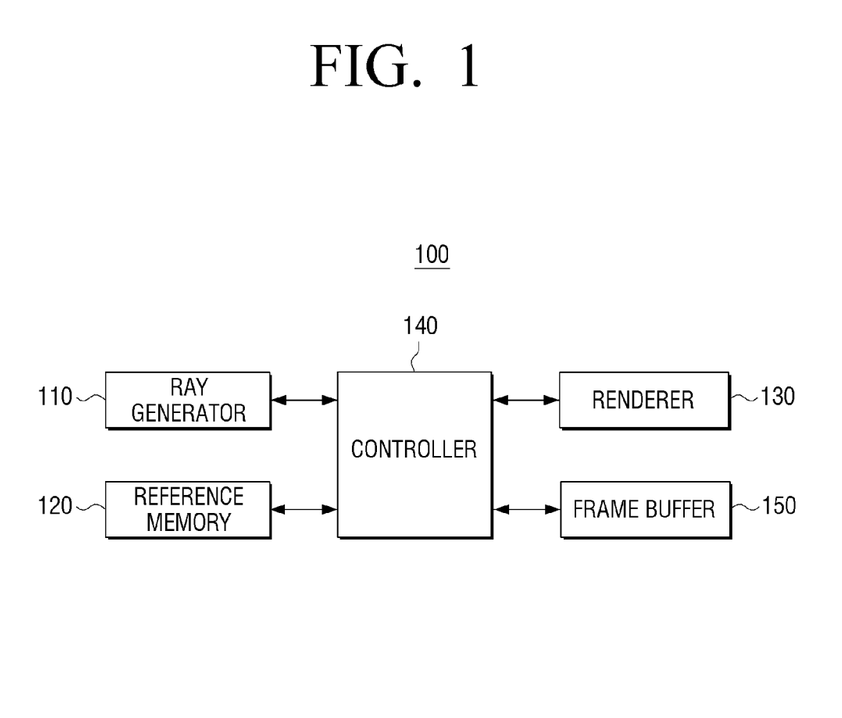
FIG. 1 is a block diagram illustrating a structure of a rendering system according to an exemplary embodiment.

FIG. 1 is a block diagram illustrating a structure of a rendering system 100 according to an exemplary embodiment. As illustrated in FIG. 1, the rendering system 100 includes a ray generator 110, a reference memory 120, a renderer 130, a controller 140 and a frame buffer 150.

The ray generator 110 generates a ray. The ray generator 110 may generate at least one ray based on ray generating information. That is, the ray generator 110 may generate a primary ray and generate a secondary ray based on the stored ray generating information. The ray generating information will be described below. In addition, the secondary ray may include a shadow ray, a refraction ray, and a reflection ray. In case of generating the secondary ray, the ray generator 110 may generate the shadow ray first. After rendering with respect to the shadow ray, the ray generator 110 may generate the refraction ray and the reflection ray.

The reference memory 120 stores information on a ray. That is, the reference memory 120 may store information required to generate the secondary ray. The reference memory 120 may be a stack or a queue, but this is only an example, and a type of the reference memory is not limited.

The information on a ray stored in the reference memory 120 may include information on a direction vector of a ray. Specially, the reference memory 120 may include information on a triangular index, a ray depth, a direction from which a ray is derived, a location of a ray, and a location where objects intersect.

The renderer 130 renders the ray generated through the ray generator 110. That is, from among components which are necessary for performing a rendering operation, the renderer 130 may include all of components except for the ray generator 110.

For example, the renderer 130 may include a component for traversing an acceleration structure used in the ray tracing method, testing an intersection, and performing a shading operation.

The controller 140 controls overall operations of the rendering system 100. In particular, the controller 140 may determine whether a secondary ray is generated by the generated ray. In addition, the controller 140 may control to store the information on the ray in the reference memory 120 according to a determining result.

That is, in response to the generated ray not being a shadow ray and intersecting with an object, the controller 140 may determine that the ray is a ray which may generate a secondary ray. The secondary ray is not generated by the shadow ray. Even though a certain ray is not a shadow ray, the ray does not generate a secondary ray unless it intersects with an object. Thus, in response to the generated ray not being a shadow ray and intersecting with an object, the controller 140 may determine that the ray may generate a secondary ray.

In response to determining that the generated ray is a ray which may generate a secondary ray, the controller 140 may control to store information on the generated ray in the reference memory 120. In addition, the controller 140 may control the ray generator 110 to generate a secondary ray based on the information on the ray stored in the reference memory 120.

In response to the generated ray being a shadow ray, the controller 140 may control to record a color value according to a rendering result of the generated ray in a frame buffer. That is, a secondary ray is not generated by a shadow ray, and thus, the controller 140 may store the color value according to a rendering result of the shadow ray in the frame buffer to terminate a rendering operation with respect to the ray. In addition, the controller 140 may determine whether the reference memory 120 includes information on the ray. In response to determining that the reference memory 120 does not include the information, the controller 140 may terminate the rendering operation.

In response to at least one secondary ray sequentially being generated by a ray and the at least one generated secondary ray not generating a secondary ray any more, the controller 140 may delete the information on the ray stored in the reference memory 120. That is, in response to determining that a secondary ray is not generated any more by the ray, the controller 140 may delete information on the ray from the reference memory 120.

In addition, in response to determining that the reference memory 120 includes information after information on a first ray is deleted from the reference memory 120, the controller 140 may generate another secondary ray based on information which was stored last in the reference memory 120.

That is, in response to the information on the ray sequentially being stored in the reference memory 120, the controller 140 may determine whether a secondary ray may be generated based on information which was stored most recently. In response to determining that the ray which was most recently stored may generate a secondary ray, the controller 140 may generate another secondary ray based on the information on the determined ray.

A method for storing the information on the ray in the reference memory 120 and deleting the information from the reference memory 120 will be described below.

By the above-described rendering system 100, a user is able to use a rendering system which effectively manages a memory and performs a rendering operation using a small capacity of memory.

Hereinafter, a method for storing information on a ray in the reference memory 120 and performing a rendering operation by the rendering system 100 will be described in detail with reference to FIGS. 2 to 4.

Figure 2:
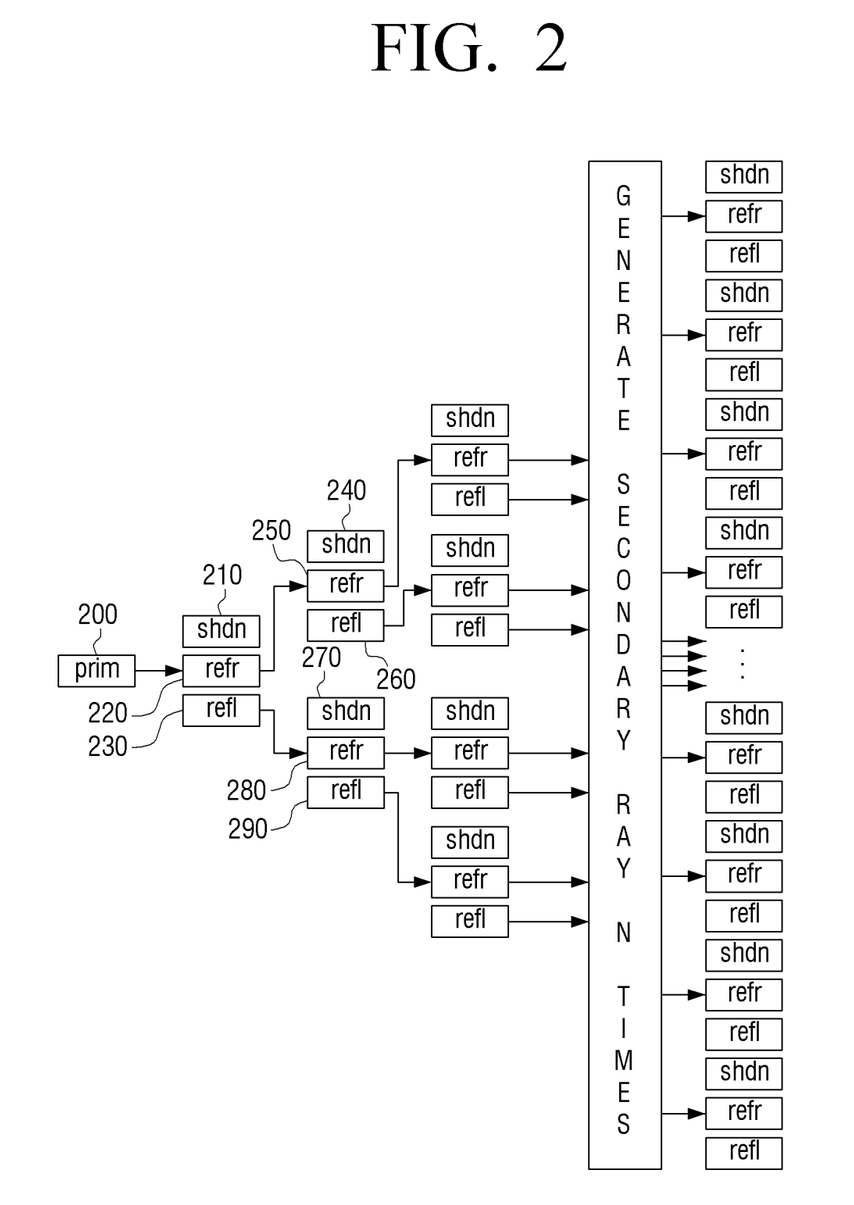
FIG. 2 is a view provided to describe a configuration for generating a secondary ray according to an exemplary embodiment.

FIG. 2 is a view provided to describe a configuration for generating a secondary ray according to an exemplary embodiment. That is, the primary ray 200 may generate at least one of a shadow ray 210, a refraction ray 220, a reflection ray 230. Specially, the primary ray 200 may generate the shadow ray 210 first and then generate the refraction ray 220 or the reflection ray 230.

The shadow ray 210 does not generate any more secondary ray. However, the refraction ray 220 and the reflection ray 230 may generate at least one secondary ray. For example, the refraction ray 220 may generate a shadow ray 240, a refraction ray 250, and a reflection ray 260 as a secondary ray. In addition, the reflection ray 230 may generate a shadow ray 270, a refraction ray 280, and a reflection ray 290 as a secondary ray.

In addition, as a secondary ray of the refraction rays 250 and 280 and the reflection rays 260 and 290, at least one of additional shadow ray, refraction ray, and reflection ray may be generated from the refraction rays 250 and 280 and the reflection rays 260 and 290.

As a result, as illustrated in FIG. 2, the number of the secondary rays increases rapidly. Accordingly, in response to the information on the generated secondary ray sequentially being stored in a memory such as a stack or a queue, the capacity of the memory may be insufficient thereby causing a loss of a part of the rays or the occurrence of the agglutination in the rendering system. In addition, the number of generated rays is not constant, and thus, a work load of the renderer 130 may vary considerably.

Figure 3:
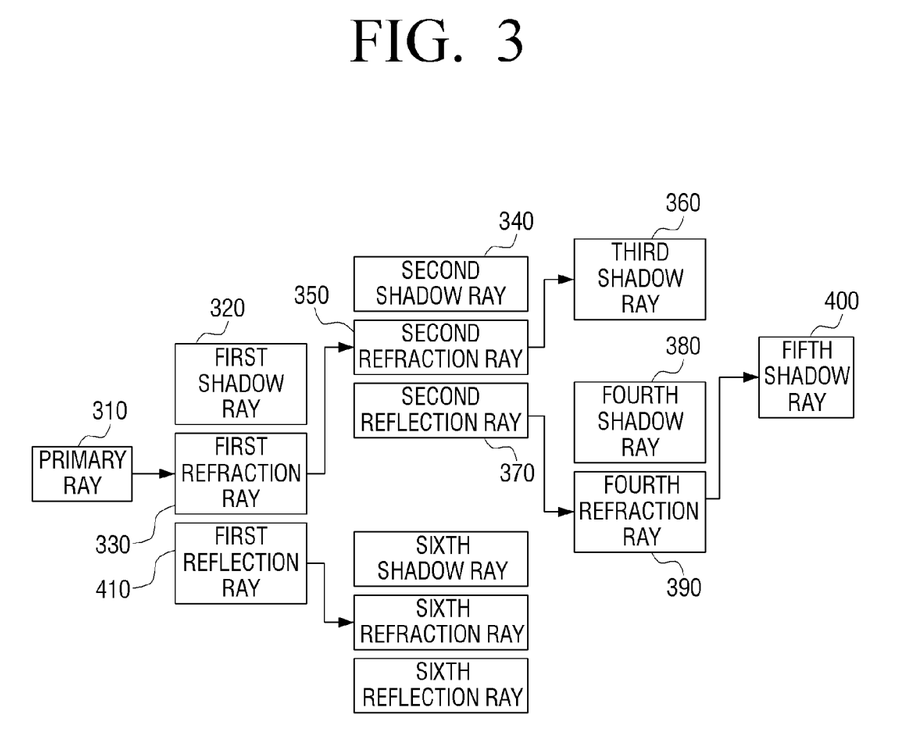
FIGS. 3 and 4 are views illustrating an order of generating a secondary ray and a method for storing the secondary ray according to the order according to an exemplary embodiment.

FIG. 3 illustrates a method for generating and storing a secondary ray according to an exemplary embodiment.

As a secondary ray of a primary ray 310, a first shadow ray 320, a first refraction ray 330, and a first reflection ray 410 are generated from the primary ray 310. In addition, as a secondary ray of the first refraction ray 330, a second shadow ray 340, a second refraction ray 350, and a second reflection ray 370 are generated from the first refraction ray 330. A third shadow ray 360 is generated from the second refraction ray 370 as a secondary ray of the second refraction ray 370. A fourth shadow ray 380 and a fourth refraction ray 390 are generated from the second reflection ray 370. In addition, a fifth shadow ray 400 is generated from the fourth refraction ray 390.

Although FIG. 3 describes only the firstly generated ray 310 as a primary ray, any ray that generates a secondary ray may be referred to as a primary ray in relation to its secondary ray. For example, with respect to a relation between the first refraction ray 330 and the second refraction ray 350, the first refraction ray 330 may be referred to as a primary ray.

Figure 4:
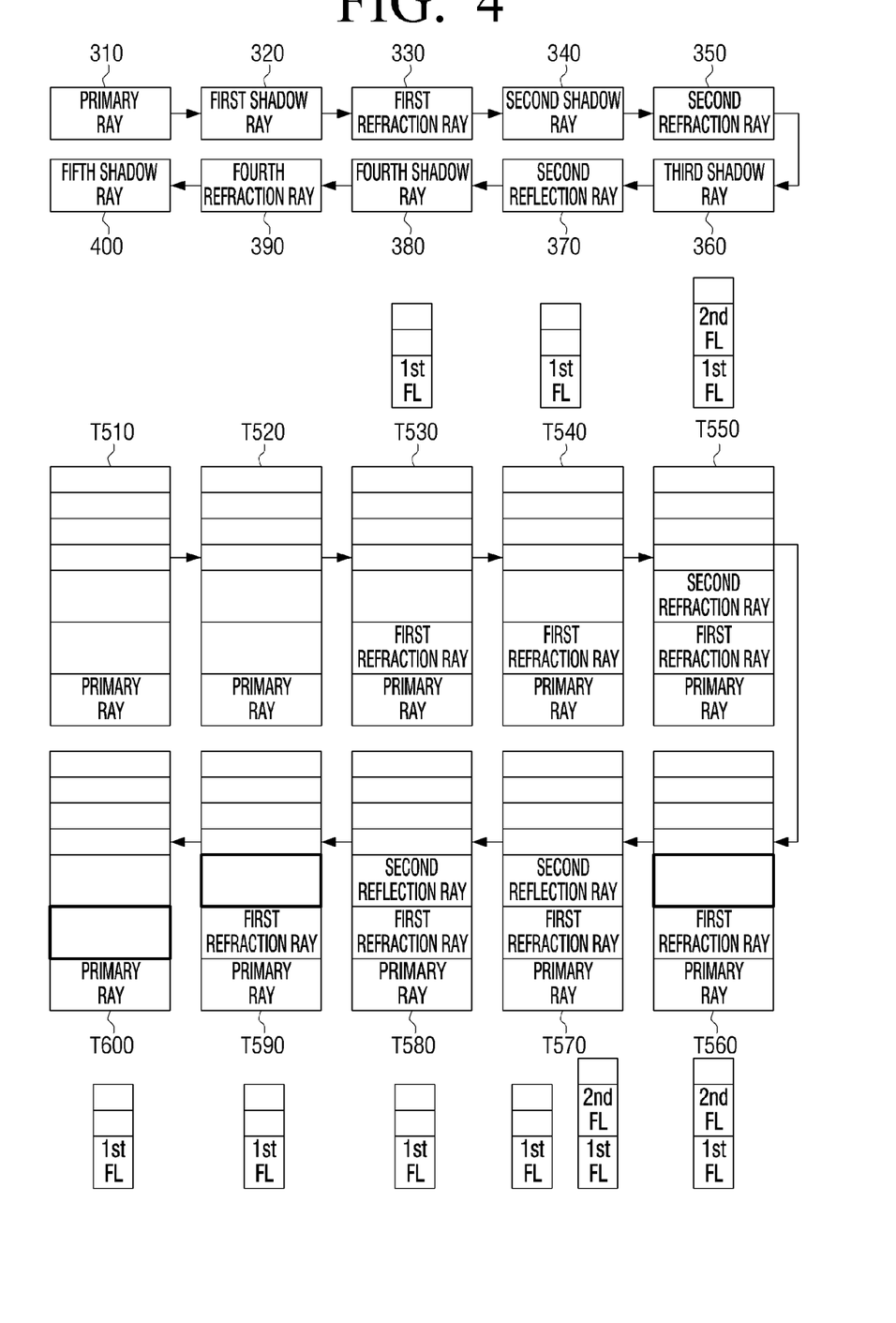

FIG. 4 is a view illustrating a storage state of the reference memory 120 according to an order of generation of a ray. In response to the primary ray 310 being generated by the ray generator 110, the controller 140 may determine whether the generated primary ray 310 is a shadow ray or a not. The primary ray 310 is not a shadow ray, and thus, the controller 140 may determine whether the primary ray 310 intersects with an object.

In response to determining that the generated primary ray 310 is not a shadow ray and intersects with an object, a secondary ray may be generated from the primary ray 310. Accordingly, the controller 140 may control the reference memory 120 to store the information on the primary ray 310.

Specially, the information on the ray may include information on a direction vector of the ray.

The ray generator 110 may generate secondary rays based on the information on the primary ray 310 stored in the reference memory 120. Among the secondary rays, a shadow ray may be generated first. That is, the ray generator 110 may generate a shadow ray first as a secondary ray and then generate a refraction ray or a reflection ray.

Accordingly, in response to the first shadow ray 320 being generated as a secondary ray, the controller 140 may control so that the information on the first shadow ray 320 is not stored in the reference memory 120 since a secondary ray is not generated any more by the first shadow ray 320. As a result, the reference memory 120 may not change after the first shadow ray 320 is generated compared with the reference memory 510 before the first shadow ray 320 is generated.

In addition, the controller 140 may store a color value according to a rendering result of the first shadow ray 320 in the frame buffer 150.

In addition, the controller 140 may determine whether the reference memory 120 includes the information on the ray. The reference memory 120 includes the information on the primary ray 310, and thus, the controller 140 may control the ray generator 110 to generate a secondary ray based on the information on the primary ray 310.

In response to the first refraction ray 330 being generated as a secondary ray, the controller 140 may determine whether the generated secondary ray is a shadow ray or not. The first refraction ray 330 is not a shadow ray, and thus, the controller 140 may determine whether the first refraction ray 330 intersects with an object. In response to determining that the first refraction ray 330 intersects with an object, more secondary rays may be generated by the first refraction ray 330, and thus, the controller 140 may store the information on the first refraction ray 330 in the reference memory 120.

In response to the second shadow ray 340 being generated by the ray generator 110 as a secondary ray based on the information on the first refraction ray 330 stored in the reference memory 120, a secondary ray is not generated any more by the second shadow ray 340, and thus, the controller 140 may not store the information on the generated second shadow ray 340. Accordingly, the state of the reference memory 120 at time T540 when the second shadow ray 340 is generated as a secondary ray may be not changed as compared with the state of the reference memory at time T530 when is before the second shadow ray 340 is generated.

According to an exemplary embodiment, the reference memory 120 may further include a secondary stack. In that case, the remaining area of the reference memory 120 excluding the secondary stack may be referred to as a main stack. Alternatively, the secondary stack may be implemented in a storage separate from the reference memory 120. The controller 140 may store the first reflection ray 410 in the secondary stack at time T530. When the controller 140 finishes processing all secondary rays derived from the first refraction ray 330 at T600, the controller 140 may refer to the secondary stack to determine what data the controller 140 is to process after T600.

The controller 140 may control to store a color value according to the rendering operation with respect to the second shadow ray 340 in the frame buffer 150.

In addition, the controller 140 may determine whether the reference memory 120 includes information on a ray. In response to determining that the reference memory 120 includes the information on the ray, the controller 140 may control the ray generator 110 to generate a secondary ray.

However, the information on the second shadow ray 340 is not stored. Thus, the latest stored information in the reference memory 120 is the information on the first refraction ray 330. Accordingly, the controller 140 may control to generate a secondary ray based on the information on the first refraction ray 330.

In response to the second refraction ray 350 being generated by the ray generator 110 as a secondary ray based on the information on the first refraction ray 330 stored in the reference memory 120, the controller 140 may determine whether the generated second refraction ray 350 is a shadow ray. The second refraction ray 350 is not a shadow ray, and thus, the controller 140 may determine whether the second refraction ray 350 intersects with an object. In response to the second refraction ray 350 intersecting with an object, more secondary rays may be generated by the second refraction ray 350. Accordingly, the controller 140 may store the information on the second refraction ray 350 in the reference memory 120 at time T550.

Further, the controller 140 may store the secondary reflection ray 370 in the secondary stack at time T550 so that the second reflection ray 370 is stacked on the first reflection ray 410. When the controller 140 finishes processing all secondary rays derived from the second refraction ray 350 at T560, the controller 140 may refer to the secondary stack to determine what data the controller 140 is to process at time T570.

In response to the third shadow ray 360 being generated by the ray generator 110 as a secondary ray based on the information on the second refraction ray 350 stored in the reference memory 120, the controller 140 may store a color value according to a rendering result of the third shadow ray 360 in the frame buffer 150. The stored second refraction ray 350 does not need to be processed any more, and thus, the controller 140 may delete the stored information on the second refraction ray 350 at time T560. Accordingly, the reference memory 120 may store only the information on the first refraction ray 330 and the primary ray 310 at time T560.

The controller 140 may determine whether the reference memory 120 includes information on a ray. In response to determining that the reference memory 120 includes the information on the ray, the controller 140 may control the ray generator 110 to generate a secondary ray.

Since the information on the second refraction ray 350 is deleted, the latest information stored in the reference memory 120 at time T560 is the information on the first refraction ray 330. Accordingly, the controller 140 may control to generate a secondary ray based on the information on the first refraction ray 330.

The ray generator 110 may generate a secondary ray based on the information on the first refraction ray 330 stored in the reference memory 120. Specially, the ray generator 110 generated the second shadow ray 340 that is a secondary ray based on the information on the first refraction ray 330 stored in the reference memory 120. Thus, the ray generator 110 may generate a reflection ray or a refraction ray as a secondary ray.

Accordingly, in response to the second reflection ray 370 being generated by the ray generator 110 as a secondary ray, the controller 140 may determine whether the generated second reflection ray 370 is a shadow ray or not. The second reflection ray 370 is not a shadow ray, and thus, the controller 140 may determine whether the second reflection ray 370 intersects with an object.

In response to determining that the second reflection ray 370 intersects with an object, more secondary ray may be generated by the second reflection ray 370. Accordingly, the controller 140 may store the information on the second reflection ray 370 in the reference memory 120 at time T570.

At time T570, the controller 140 may refer to the secondary stack to determine, between the secondary refraction ray 350 and the secondary reflection ray 370, which one is not yet processed. As shown in FIG. 4, the secondary stack indicates that the secondary reflection ray 370 is to be processed at time T570, the controller 140 may load the secondary reflection ray 370 from the secondary stack and store it in the main stack of the reference memory 120 at time T570.

In response to determining that the second reflection ray 370 is a refraction ray or a reflection ray, not a shadow ray, and the refraction ray or the reflection ray does not intersect with an object, the controller 140 may not store the information on the ray in the reference memory 120.

In addition, the controller 140 may control the ray generator 110 to generate a secondary ray based on the information on the second reflection ray 370 stored in the reference memory 120.

The ray generator 110 may generate the fourth shadow ray 380 first as a secondary ray by the second reflection ray 370. The controller 140 may determine whether the generated ray is a shadow ray or not. In addition, a secondary ray is not generated any more by the fourth shadow ray 380, and thus, the controller 140 may not store information on the fourth shadow ray 380 at time T580. Accordingly, the state of the reference memory 120, at a time T580 when the fourth shadow ray 380 is generated as a secondary ray, is not changed as compared with the state of reference memory 120 at a time T570 when is before the fourth shadow ray 380 is generated.

The controller 140 may determine whether the reference memory 120 includes any information on a ray. In response to determining that the reference memory 120 includes the information, the controller 140 may control the ray generator 110 to generate a secondary ray.

In addition, in response to determining that the ray generator 110 generates the fourth refraction ray 390 based on the information on the second reflection ray 370 stored in the reference memory 120, and a secondary ray is not generated any more by the second reflection ray 370, the controller 140 may control the reference memory 120 to delete the information on the second reflection ray 370.

Accordingly, as a result of the rendering operation with respect to the fourth refraction ray 390, the reference memory 120 may delete the information on the second reflection ray 370 at time T590 by control of the controller 140.

In addition, the controller 140 may determine whether the fourth refraction ray 390 is a shadow ray or not. The fourth refraction ray 390 is not a shadow ray, and thus, the controller 140 may determine whether the fourth refraction ray 390 intersects with an object. In response to determining that the fourth refraction ray 390 intersects with an object, the ray generator 110 may generate a secondary ray by the fourth refraction ray 390. The ray generator 110 may generate a shadow ray first as a secondary ray. Accordingly, in response to a fifth shadow ray 500 being generated as a secondary ray, the controller 140 may control to store a color value according to a rendering result of the fifth shadow ray 500 in the frame buffer 150. In addition, a secondary ray is not generated any more by the first refraction ray 330, and thus, the controller 140 may control the reference memory 120 to delete the information on the first refraction ray 330 at time T600.

In addition, the controller 140 may determine whether the reference memory 120 includes any information on a ray. As shown in FIG. 4, the primary ray 310 is stored in the reference memory 120 at time T600, and thus, the ray generator 110 may generate a secondary ray based on the information on the stored primary ray 310.

According, the controller 140 may generate the first reflection ray 410 as a secondary ray based on the information on the primary ray 310 stored in the reference memory 120. For example, the controller 140 may load the first reflection ray 410 from the secondary stack after time T600, and store it in the main stack of the reference memory 120. Thereby, the controller 140 may determine, between the first refraction ray 330 and the first reflection ray 410, the first reflection ray 140 is not yet processed, and proceed with the first reflection ray 410 after time T600. In addition, the rendering system 100 may perform a rendering operation with respect to a secondary ray by the first reflection ray through the above-described process.

In response to a rendering operation being performed with respect to the entire secondary rays and the reference memory 120 not including any other information on a ray, the rendering system 100 may terminate the rendering operation.

In the above exemplary embodiment described with reference to FIG. 4, the controller 140 determines the process using the secondary stack, but this is only an example. The controller 140 may determine the process using various methods. For example, when information regarding the first refraction ray 330 is deleted from the memory 120, the controller 140 may record the information regarding the deletion in the memory 120 separately and determine the next process by proceed with the process without any record of deletion with reference to the information. In this case, a separate secondary stack is not required.

Figure 5:
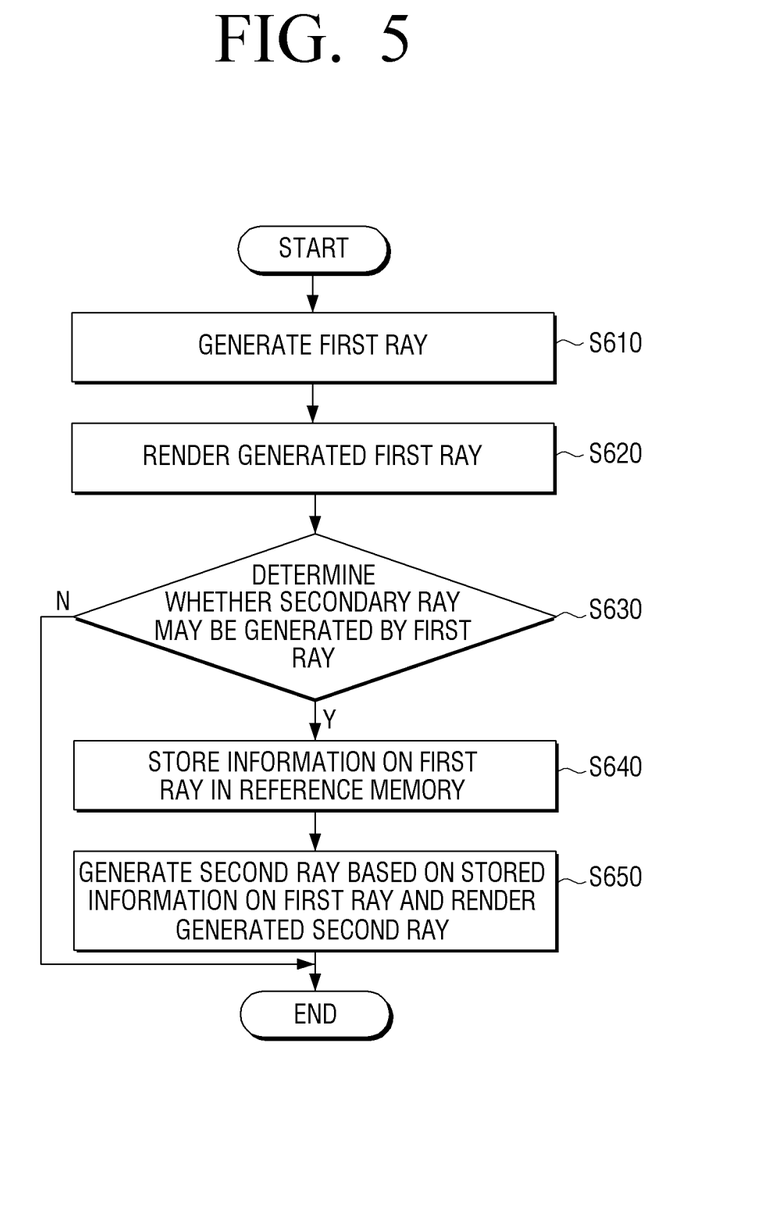
FIG. 5 is a flowchart provided to describe an order of generating a secondary ray according to an exemplary embodiment.

FIG. 5 is a flowchart provided to describe an order of generating a secondary ray according to an exemplary embodiment. The rendering system 100 generates a first ray (operation S610) and renders the generated first ray (operation S620).

In response to determining that a secondary ray is capable of generating by the first ray (operation S630—Y), the rendering system 100 stores information on the first ray in the reference memory 120 (operation S640). Specially, if the generated ray is not a shadow ray and intersects with an object, the rendering system 100 may determine that the ray may generate a secondary ray. In addition, in response to determining that the generated ray is capable of generating a secondary ray, the rendering system 100 may store the information on the generated ray in the reference memory 120.

The rendering system 100 generates a second ray based on the stored information on the first ray and renders the generated second ray (operation S650). The information on the ray may include a direction vector of the ray. Accordingly, the rendering system 100 may generate the second ray that is a secondary ray of the first ray based on the information on the direction vector of the stored ray. Specially, the rendering system 100 may generate a shadow ray first from among secondary rays. After generating the shadow ray, the rendering system 100 may generate a refraction ray or a reflection ray as a secondary ray.

Figure 6:
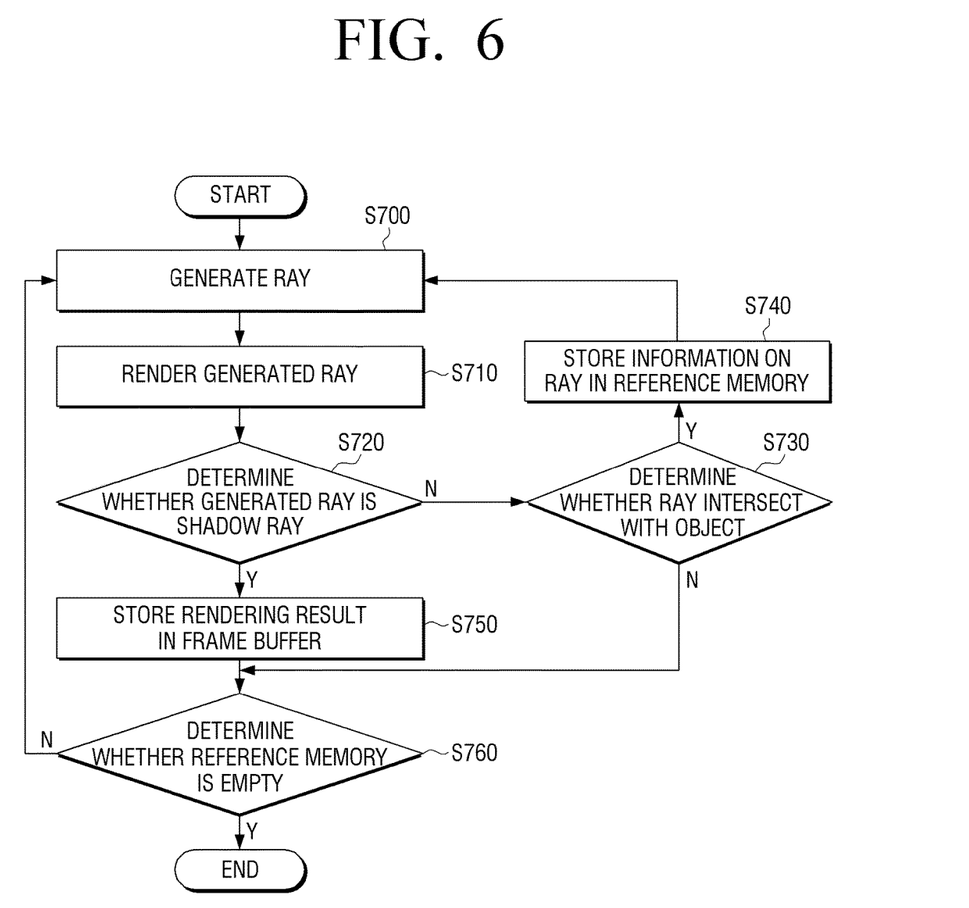
FIG. 6 is a flowchart provided to describe an order of generating a recursive secondary ray according to an exemplary embodiment.

FIG. 6 is a flowchart provided to specifically describe an recursive order of generating a recursive secondary ray according to an exemplary embodiment.

The rendering system 100 generates a ray (operation S700) and renders the generated ray (operation S710). In addition, the rendering system 100 determines whether the generated ray is a shadow ray (operation S720).

In response to determining that the ray does not intersect with an object, a secondary ray is not generated even though the ray is not a shadow ray. Accordingly, the rendering system 100 determines whether the ray intersects with an object (operation S730).

In response to determining that the ray intersects with an object (operation S730—Y), the rendering system 100 stores information on the ray in the reference memory 120 in order to generate a secondary ray of the ray. In addition, the rendering system 100 may generate a ray based on the information on the ray stored in the reference memory 120. In this case, the rendering system 100 may generate a shadow ray first from among secondary rays. For example, in response to the rendering system 100 generating a shadow ray and a refraction ray as a secondary ray, the rendering system 100 may generate a shadow ray first.

In response to determining that the generated ray is a shadow ray (operation S720—Y), the rendering system 100 stores a rendering result in the frame buffer 150 (operation S750). In addition, the rendering system 100 determines whether the reference memory 120 is empty (operation S760).

In addition, if the ray is determined as not intersecting with an object and not being a shadow ray, the rendering system 100 may determine whether the reference memory 120 is empty (operation S760).

In addition, in response to determining that a secondary ray is not generated any more by the ray, the rendering system 100 may delete the information on the ray from the reference memory 120.

Accordingly, the rendering system 100 may control an amount of rays generated by the ray generator 110 to be constant.

Figure 7:
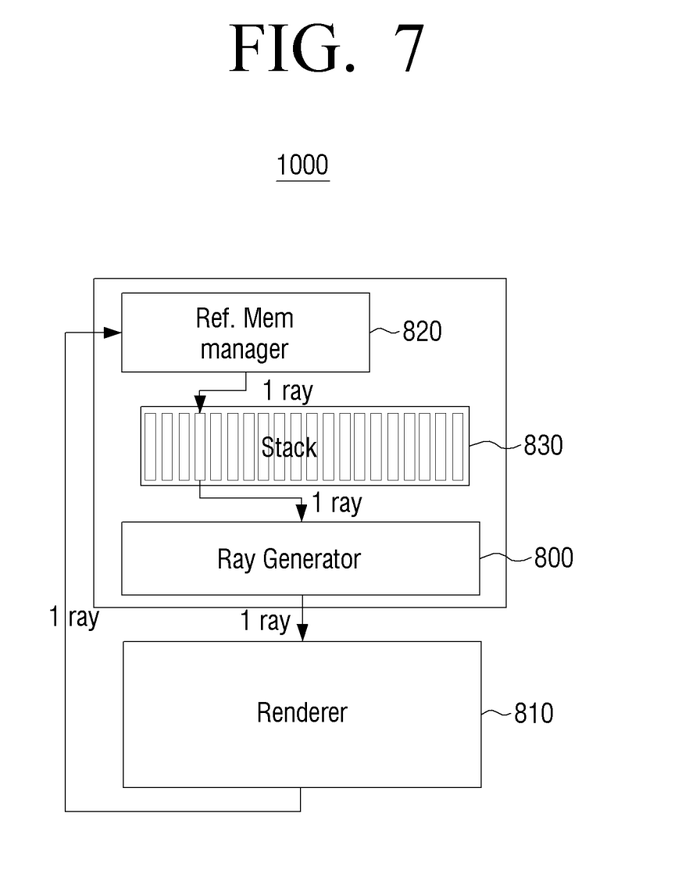
FIGS. 7 and 8 are views illustrating a configuration of a rendering system according to an exemplary embodiment.

FIG. 7 illustrates a rendering system 1000 including a reference memory 830 using a stack structure or a stack-based memory allocation. However, this is only an example, and various types of memory structure or memory allocation methods including a queue may be used.

The rendering system 1000 may generate a ray through a ray generator 800 as illustrated in FIG. 7. In addition, with respect to the generated ray, the rendering system 1000 may traverse an acceleration structure, test an intersection, and perform a rendering operation through a renderer 810 in which a component for performing shading is included.

A reference memory manager 820 may determine whether a secondary ray may be generated from the generated ray. In response to determining that the generated ray may generate a secondary ray, the reference memory manager 820 may store information on the generated ray in the reference memory 830.

If the ray is not a shadow ray and intersects with an object, the reference memory manager 820 may determine that the ray may generate a secondary ray.

In response to a rendering operation being performed with respect to a shadow ray, the rendering system 1000 may store a rendering result with respect to the shadow ray in the frame buffer 150. That is, the rendering system 1000 may store a color value with respect to the shadow ray in the frame buffer 150.

In response to determining that a secondary ray is not generated any more from the ray to which the rendering operation was performed, the reference memory manager 820 may control the reference memory 830 to delete the information on the ray.

Figure 8:
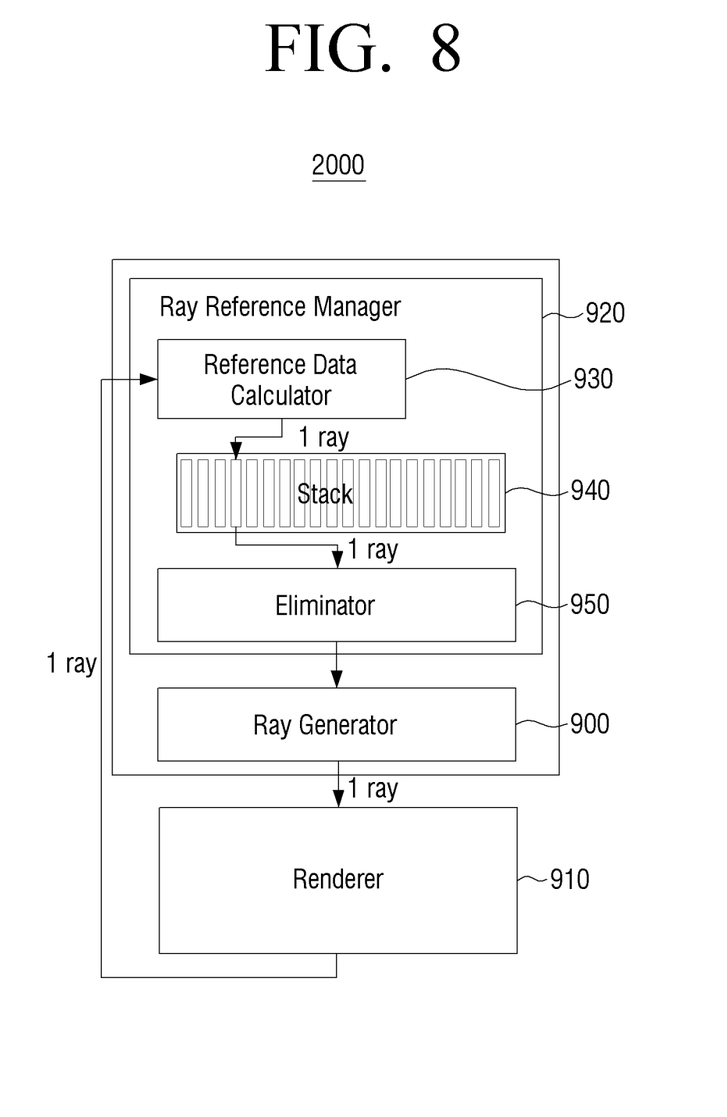

FIG. 8 is a view illustrating a rendering system 2000 according to another exemplary embodiment. The rendering system 2000 of FIG. 8 also may generate a ray by a ray generator 9000. In addition, with respect to the generated ray, the rendering system 2000 may traverse an acceleration structure, test an intersection, and perform a rendering operation through a renderer 910 in which a component for performing shading is included.

In addition, the rendering system 2000 may manage information on a ray through a ray reference manager 920. Specially, a reference data calculator 930 may determine whether a secondary ray may be generated by the generated ray. In response to determining that the generated ray may generate a secondary ray, the reference data calculator 930 may calculate information on the generated ray and store the calculated information in a reference memory 940. If the generated ray is not a shadow ray and intersects with an object, the reference data calculator 930 may determine that the ray may generate a secondary ray, and calculate the information on the generated ray. For example, with respect to the generated ray, the reference data calculator 930 may calculate a triangular index, a ray depth, a direction from which the ray is derived, a location of the ray, and a location where the ray and the object intersect.

In addition, in response to a rendering operation being performed with respect to a shadow ray, the rendering system 2000 may store a rendering result of the shadow ray in the frame buffer 150. That is, the rendering system 2000 may store a color value with respect to the shadow ray in the frame buffer 150.

In response to determining that the rendered ray does not generate a secondary ray any more, an eliminator 950 may control the reference memory 940 to delete information on the ray. That is, the eliminator 950 may pull the information on the ray stored in the reference memory 940 and delete the information. For example, in response to only a shadow ray being generated as a secondary ray by the rendered ray, the eliminator 950 may delete the information on the ray stored in the reference memory 940.

Accordingly, through the rendering system 2000 as illustrated in FIG. 8, a user is able to use the rendering system 2000 which manages a memory effectively and performs a rendering operation with the reference memory 940.

Figure 9:
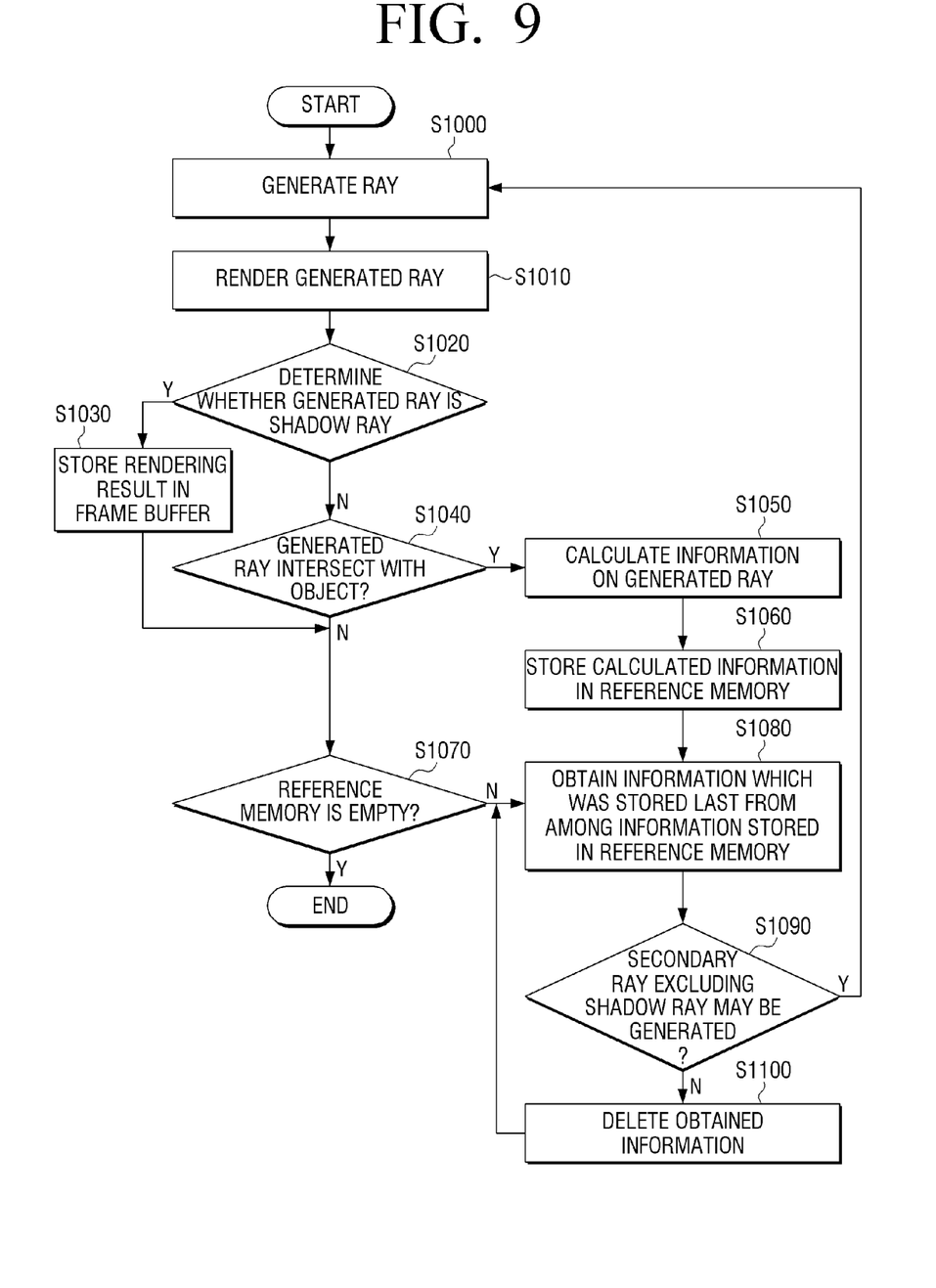
FIG. 9 is a flowchart provided to describe an order to generating a ray according to an exemplary embodiment.

FIG. 9 is a flowchart provided to describe a method of generating a ray of a rendering system according to an exemplary embodiment. The rendering system 100 generates a ray (operation S1000) and renders the generated ray (operation S1010). In addition, the rendering system 100 may store a color value according to a rendering result with respect to the generated ray in the frame buffer 150 to complete the rendering operation with respect to the ray.

The rendering system 100 determines whether the generated ray is a shadow ray (operation S1020). In response to determining that the generated ray is not a shadow ray (operation S1020—N), the rendering system 100 may determine whether the generated ray intersects with an object (operation S1040).

In response to determining that the generated ray intersects with an object (operation S1040—Y), the rendering system 100 calculates information on the generated ray (operation S1050). In addition, the rendering system 100 stores the calculated information in the reference memory (operation S1060). If the generated ray is not a shadow ray and intersects with an object, a secondary ray may be generated. Accordingly, the rendering system 100 may store the calculated information in the reference memory in order to generate a secondary ray.

In response to the generated ray being a shadow ray (operation S1020—Y), the rendering system 100 stores a rendering result in the frame buffer 150 (operation S1030). That is, the rendering system 100 may store a color value according to the rendering result of the shadow ray in the frame buffer 150. Then, the rendering system 100 determines whether the reference memory is empty (operation S1070). In addition, in response to the generated ray not intersecting with an object, the rendering system 100 may determine whether the reference memory is empty even though the generated ray is not a shadow ray (operation S1070).

In response to determining that the reference memory is empty (operation S1070—Y), the rendering system 100 may terminate a rendering operation. In response to determining that the reference memory is not empty (operation S1070—N), or the calculated information is included in the reference memory (operation S1060), the rendering system 100 obtains information which was stored last among information stored in the reference memory (operation S1080) and determines whether a secondary ray excluding a shadow ray may be generated (operation S1090). In this case, a case where a secondary ray excluding a shadow ray may be generated may refer to a case where a ray of which information is stored intersects with an object.

In response to determining that a secondary ray excluding a shadow ray may not be generated (operation S1090—N), the rendering system 100 deletes the obtained information (operation S1100).

Specially, in response to the ray related to the obtained information not generating a secondary ray, such as a reflection ray or a refraction ray, any more, the rendering system 100 may delete the obtained information. In addition, even when the ray related to the obtained information generates only a shadow ray as a secondary ray, the rendering system 100 may delete the ray on the obtained information as the shadow ray is generated and rendered.

In response to determining that a secondary ray excluding a shadow ray may be generated (operation S1090—Y), the rendering system 100 may generate a ray based on the obtained information (operation S1000). That is, the rendering system 100 may generate a ray in a recursive manner until the entire information stored in the reference memory is deleted.

According to the various exemplary embodiments, a user is able to use a rendering system which effectively uses a memory by controlling an amount of information on a ray to be stored in the memory thereby enhancing the performance thereof.

While not restricted thereto, one or more exemplary embodiments can be implemented as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an exemplary embodiment may be written as a computer program transmitted over a computer-readable transmission medium, such as a carrier wave, and received and implemented in general-use or special-purpose digital computers that execute the programs. Moreover, it is understood that in exemplary embodiments, one or more units of the above-described apparatuses and devices can include circuitry, a processor, a microprocessor, etc., and may execute a computer program stored in a computer-readable medium.

The foregoing embodiments and advantages are merely exemplary and are not to be construed as limiting the inventive concept. The teachings of the present disclosure can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method for performing a rendering process of a rendering system, the method comprising:
   generating a primary ray to render an image;
   identifying whether the primary ray is capable of generating at least one secondary ray; and
   when it is identified that the primary ray is capable of generating the at least one secondary ray:
      storing first information which is calculated based on the primary ray in a memory and generating the at least one secondary ray based on the first information on the primary ray stored in the memory,
      storing second information which is calculated based on the at least one secondary ray in the memory in response to identifying that the at least one secondary ray generates a refraction ray or a reflection ray, and
      deleting the first information which is calculated based on the primary ray from the memory in response to identifying that the at least one secondary ray generates a shadow ray.

2. The method as claimed in claim 1, wherein the identifying comprises identifying that the primary ray is capable of generating the at least one secondary ray in response to the primary ray intersecting with an object and the primary ray not being a shadow ray.

3. The method as claimed in claim 1, further comprising:
   identifying whether the memory includes any information on a ray; and
   generating the at least one secondary ray, in response to identifying that the memory includes a plurality of pieces of information, based on information on a ray which was stored last in the memory from among the plurality of pieces of information.

4. The method as claimed in claim 1, further comprising:
   storing a rendering result of the primary ray as a color value in a frame buffer in response to the primary ray being a shadow ray.

5. The method as claimed in claim 1, further comprising:
   terminating the rendering process in response to the memory not including any information on a ray.

6. The method as claimed in claim 1, wherein the first information on the primary ray comprises information on a direction vector of the primary ray.

7. The method as claimed in claim 1, wherein the storing comprises storing the first information on the primary ray in a main stack of the memory,
   wherein the at least one secondary ray comprises a plurality of secondary rays, and
   wherein the method further comprises:
      storing one of the plurality of secondary rays in the main stack; and
      storing, in a secondary stack of the memory, the plurality of secondary rays other than the one of the plurality of secondary rays.

8. The method of claim 1, further comprising:
   deleting the first information on the primary ray in response to the primary ray not being capable of generating an additional derivable secondary ray.

9. The method of claim 8, wherein the at least one secondary ray corresponds to a refraction ray or a reflection ray that intersects with an object.

10. The method of claim 8, wherein the at least one secondary ray is one of a plurality of secondary rays that the primary ray generates, and the storing comprises:
    storing the at least one secondary ray in a main stack of the memory; and
    storing, in a secondary stack of the memory, the plurality of secondary rays other than the at least one secondary ray and a shadow ray.

11. The method of claim 8, wherein the at least one secondary ray is a refraction ray or a reflection ray derived from the primary ray, and the storing comprises:

storing information on the refraction ray or information on the reflection ray in a main stack of the memory;

storing the information on the refraction ray in a secondary stack of the memory in response to the reflection ray being stored in the main stack; and storing the information on the reflection ray in the secondary stack in response to the refraction ray being stored in the main stack.

12. The method of claim 11, further comprising loading into the main stack the information on the refraction ray or the information on the reflection ray which is stored in the secondary stack;

identifying whether the refraction ray or the reflection ray that corresponds to the loaded information generates a secondary ray.

13. A non-transitory computer readable storage medium storing a program that is executable by a computer to perform the method of claim 8.

14. A rendering system comprising:

a ray generator configured to generate a primary ray;

a renderer configured to render an image based on the generated primary ray;

a memory; and a controller configured to:

identify whether the primary ray is capable of generating at least one secondary ray, and when it is identified that the primary ray is capable of generating the at least one secondary ray:

store first information which is calculated based on the primary ray in the memory and generate the at least one secondary ray based on the first information on the primary ray stored in the memory, store second information which is calculated based on the at least one secondary ray in the memory in response to identifying that the at least one secondary ray generates a refraction ray or a reflection ray, and delete the first information which is calculated based on the primary ray from the memory in response to identifying that the at least one secondary ray generates a shadow ray.

15. The rendering system as claimed in claim 14, wherein the controller is further configured to identify that the primary ray is capable of generating the at least on secondary ray in response to the primary ray interacting with an object and not being a shadow ray.

16. The rendering system as claimed in claim 14, the controller is further configured to identify whether the memory includes any information on a ray, and in response to identifying that the memory includes a plurality of pieces of information, generate the at least one secondary ray based on information on a ray which was stored last in the memory from among the plurality of pieces of information.

17. The rendering system as claimed in claim 14, the controller is further configured to store a rendering result of the primary ray in a frame buffer in response to the primary ray being a shadow ray.

18. The rendering system as claimed in claim 14, wherein the controller is further configured to identify whether the memory includes any information on a ray and terminate a rendering process of the rendering system in response to the memory not including any information on a ray.

19. The rendering system as claimed in claim 14, wherein the first information on the primary ray comprises information on a direction vector of the primary ray.

20. The rendering system as claimed in claim 14, wherein the memory comprises a main stack and a secondary stack, wherein the at least one secondary ray comprises a plurality of secondary rays, and wherein the controller is further configured to:

store the first information on the primary ray in the main stack of the memory in response to identifying that the primary ray is capable of generating the at least one secondary ray;

store one of the plurality of secondary says in the main stack of the memory; and store, in the secondary stack of the memory, the plurality of secondary rays other than the one of the plurality of secondary rays.

\* \* \* \* \*